US011769923B2

(12) United States Patent
Sassi et al.

(10) Patent No.: US 11,769,923 B2
(45) Date of Patent: Sep. 26, 2023

(54) RIGID LINKAGES FOR BATTERY PACKS

(71) Applicant: FORD GLOBAL TECHNOLOGIES, LLC, Dearborn, MI (US)

(72) Inventors: Abdelmonaam Sassi, Windsor (CA); Courtney L'Arrivée, Royal Oak, MI (US); Steven Michael Lutowsky, Jr., Canton, MI (US); Shekar Prabhakar Erasala, Northville, MI (US); Heiko Landsmann, Cologne (DE); Binyamin Qamruzzaman, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 104 days.

(21) Appl. No.: 17/145,682

(22) Filed: Jan. 11, 2021

(65) Prior Publication Data

US 2022/0223962 A1    Jul. 14, 2022

(51) Int. Cl.
*H01M 50/242* (2021.01)
*H01M 50/249* (2021.01)
*H01M 50/262* (2021.01)

(52) U.S. Cl.
CPC ....... *H01M 50/242* (2021.01); *H01M 50/249* (2021.01); *H01M 50/262* (2021.01)

(58) Field of Classification Search
None
See application file for complete search history.

(56) References Cited

U.S. PATENT DOCUMENTS

| 8,012,620 | B2 | 9/2011 | Takasaki et al. | |
| 8,839,895 | B2* | 9/2014 | Kato | H01M 50/242 |
| | | | | 180/68.5 |
| 9,027,684 | B2* | 5/2015 | Araki | B60K 1/04 |
| | | | | 180/311 |
| 9,034,502 | B2 | 5/2015 | Kano et al. | |
| 10,207,574 | B2* | 2/2019 | Ozawa | H01M 50/20 |
| 10,518,621 | B2 | 12/2019 | Nitta et al. | |
| 10,549,706 | B2 | 2/2020 | Syed et al. | |
| 10,603,999 | B2* | 3/2020 | Fukui | B62D 25/20 |
| 10,651,440 | B1* | 5/2020 | Khan | B60K 1/04 |
| 10,766,348 | B2* | 9/2020 | Fukui | B62D 21/09 |
| 11,034,229 | B2* | 6/2021 | Kosuge | H01M 50/20 |
| 11,091,017 | B2* | 8/2021 | Shin | B60L 50/66 |
| 11,247,550 | B2* | 2/2022 | Grace | H01M 50/244 |

(Continued)

FOREIGN PATENT DOCUMENTS

| CN | 103009980 A * | 4/2013 | ............... B60K 1/04 |
| CN | 105870377 A | 8/2016 | |

(Continued)

*Primary Examiner* — Katy M Ebner
(74) *Attorney, Agent, or Firm* — David B. Kelley; Carlson, Gaskey & Olds, P.C.

(57) ABSTRACT

This disclosure details rigid linkages for mounting traction battery packs to portions of a vehicle frame. The rigid linkages are designed to allow the traction battery pack to articulate away from deforming structures of the vehicle frame as part of an energy distribution system. During the articulation, the rigid linkage is capable of conserving its integrity to push the traction battery pack away from the deforming structures, thereby preventing the deforming structures from contacting the traction battery pack.

19 Claims, 4 Drawing Sheets

(56) References Cited

U.S. PATENT DOCUMENTS

| | | | | |
|---|---|---|---|---|
| 2013/0075173 A1* | 3/2013 | Kato | ............... | H01M 50/249 |
| | | | | 180/68.5 |
| 2015/0197144 A1* | 7/2015 | Jarocki | ............... | B60L 3/0007 |
| | | | | 180/68.5 |
| 2016/0311301 A1* | 10/2016 | Ikeda | ............... | B62D 29/001 |
| 2019/0061508 A1* | 2/2019 | Sawatzki | ............... | B60K 13/04 |
| 2019/0359046 A1* | 11/2019 | Tsuyuzaki | ............... | B60L 50/66 |
| 2019/0359048 A1* | 11/2019 | Tsuyuzaki | ............... | B60K 1/04 |
| 2019/0366824 A1* | 12/2019 | Wakebe | ............... | B60L 50/64 |
| 2020/0070641 A1* | 3/2020 | Kosuge | ............... | B60L 50/64 |
| 2020/0070671 A1* | 3/2020 | Ohkuma | ............... | B60L 50/66 |
| 2020/0079200 A1* | 3/2020 | Suzuki | ............... | B60R 16/0207 |
| 2020/0282816 A1* | 9/2020 | Matsuda | ............... | B60K 1/04 |
| 2020/0307366 A1* | 10/2020 | Grace | ............... | B60L 50/66 |
| 2022/0089039 A1* | 3/2022 | Sassi | ............... | B60K 1/04 |
| 2022/0131226 A1* | 4/2022 | Chen | ............... | H01M 50/242 |
| 2022/0185379 A1* | 6/2022 | Kim | ............... | B60K 1/04 |
| 2022/0190414 A1* | 6/2022 | An | ............... | B62D 25/20 |
| 2022/0258620 A1* | 8/2022 | Iemura | ............... | B60K 1/04 |

FOREIGN PATENT DOCUMENTS

| | | | | |
|---|---|---|---|---|
| DE | 102019101728 A1 * | 9/2019 | ............ | B60R 16/02 |
| DE | 102018132167 A1 * | 6/2020 | | |
| JP | 2019151294 A * | 9/2019 | ............ | B60K 1/04 |
| JP | 2020011607 A * | 1/2020 | ............ | B60K 1/04 |

\* cited by examiner

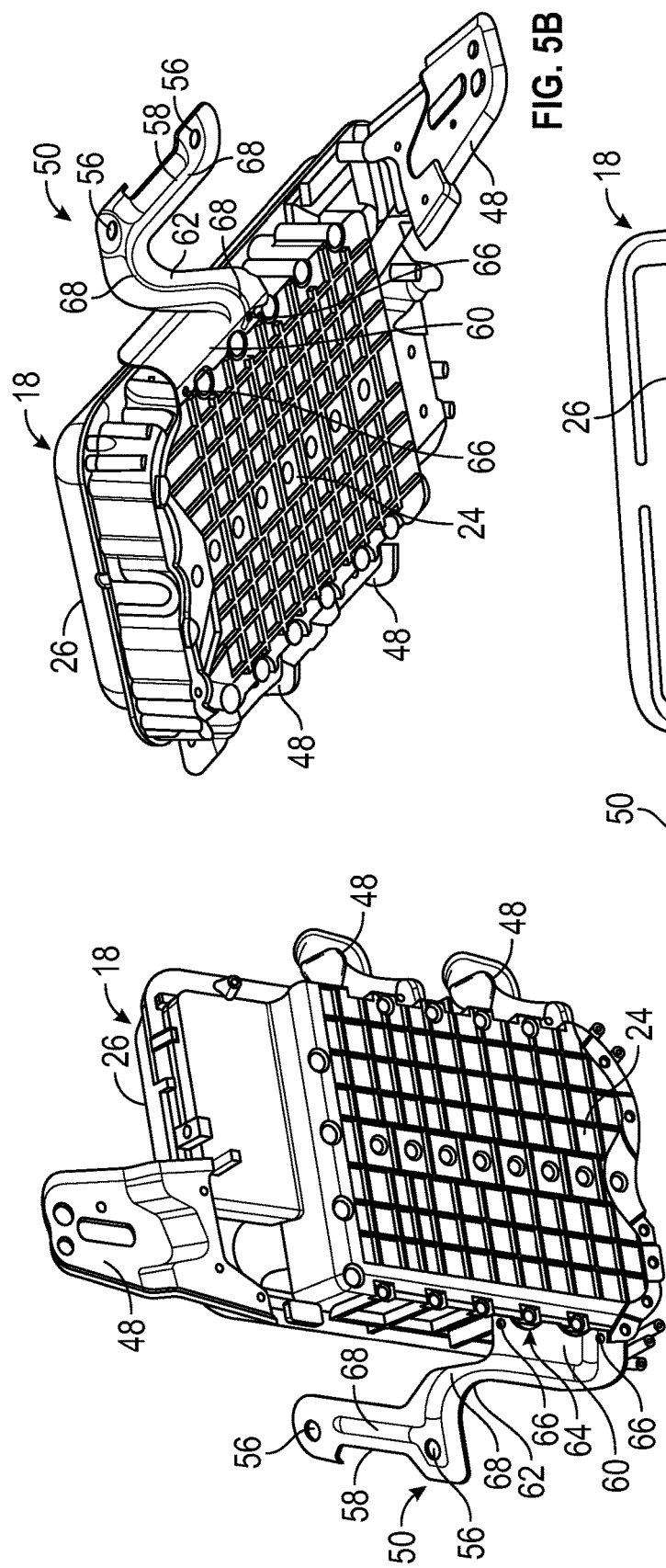
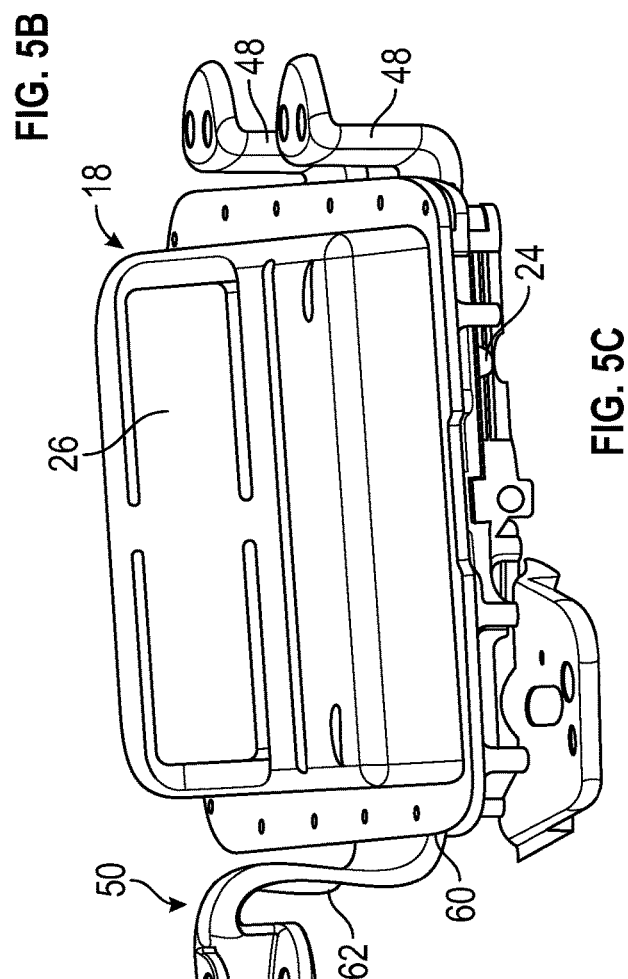
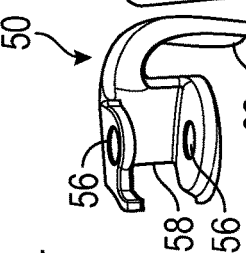

RIGID LINKAGES FOR BATTERY PACKS

TECHNICAL FIELD

This disclosure relates generally to electrified vehicles, and more particularly to rigid linkages designed to allow a traction battery pack to articulate away from a deforming vehicle structure.

BACKGROUND

Some electrified vehicles include a traction battery pack packaged at underbody locations of the vehicle. At these locations, the traction battery pack may be positioned near deformable structures.

SUMMARY

An electrified vehicle according to an exemplary aspect of the present disclosure includes, among other things, a frame including a cross-member, a traction battery pack, and a rigid linkage that connects between the cross-member and the traction battery pack. The rigid linkage is configured to articulate the traction battery pack away from a deforming structure of the frame.

In a further non-limiting embodiment of the foregoing electrified vehicle, the frame includes a rocker and a longitudinal member, and the traction battery pack is mounted axially between the rocker and the longitudinal member.

In a further non-limiting embodiment of either of the foregoing electrified vehicles, the cross-member is a seat cross-member that extends between the rocker and the longitudinal member.

In a further non-limiting embodiment of any of the foregoing electrified vehicles, a mounting bracket connects between the traction battery pack and the longitudinal member.

In a further non-limiting embodiment of any of the foregoing electrified vehicles, the rigid linkage, the cross-member, the mounting bracket, and the traction battery pack establish a four-bar linkage for supporting the traction battery pack relative to the frame.

In a further non-limiting embodiment of any of the foregoing electrified vehicles, the rigid linkage includes a first mount section mounted to the cross-member, a second mount section mounted to the traction battery pack, and a curved bridge section extending between the first mount section and the second mount section.

In a further non-limiting embodiment of any of the foregoing electrified vehicles, a fastener is received through the first mount section and the cross-member.

In a further non-limiting embodiment of any of the foregoing electrified vehicles, the fastener further extends through a floor panel of the frame.

In a further non-limiting embodiment of any of the foregoing electrified vehicles, the rigid linkage is comprised of a boron steel, the cross-member is comprised of a dual phase steel, and the floor panel is comprised of a mild steel.

In a further non-limiting embodiment of any of the foregoing electrified vehicles, the rigid linkage is made of high strength low alloy material, and the cross-member is made of a different material than the rigid linkage.

In a further non-limiting embodiment of any of the foregoing electrified vehicles, a mounting bracket that connects between the traction battery pack and a longitudinal member of the frame establishes a pivot point for pivoting the traction battery pack as the traction battery pack articulates away from the deforming structure.

In a further non-limiting embodiment of any of the foregoing electrified vehicles, the deforming structure is a floor panel of the frame.

In a further non-limiting embodiment of any of the foregoing electrified vehicles, the rigid linkage maintains a gap between a cover of the traction battery pack and the cross-member.

A method according to another exemplary aspect of the present disclosure includes, among other things, mounting a traction battery pack to a vehicle frame with a rigid linkage, and articulating a portion of the traction battery pack connected to the rigid linkage away from a deforming structure of the vehicle frame.

In a further non-limiting embodiment of the foregoing method, mounting the traction battery pack includes bolting the rigid linkage to a seat-cross member of the vehicle frame.

In a further non-limiting embodiment of either of the foregoing methods, mounting the traction battery pack includes mounting the traction battery pack to a longitudinal member of the vehicle frame with a mounting bracket.

In a further non-limiting embodiment of any of the foregoing methods, as the portion of the traction battery pack articulates, the traction battery pack pivots at a pivot point established by the mounting bracket.

In a further non-limiting embodiment of any of the foregoing methods, the rigid linkage, the seat cross-member, the mounting bracket, and the traction battery pack establish a four-bar linkage for supporting the traction battery pack relative to the vehicle frame.

In a further non-limiting embodiment of any of the foregoing methods, the rigid linkage is made of a boron steel.

In a further non-limiting embodiment of any of the foregoing methods, the deforming structure is a floor panel of the frame.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIGS. 5A, 5B, and 5C illustrate the rigid linkage as part of the traction battery pack mounting system from various different vantage points.

DETAILED DESCRIPTION

This disclosure details rigid linkages for mounting traction battery packs to portions of a vehicle frame. The rigid linkages are designed to allow the traction battery pack to articulate away from deforming structures of the vehicle frame as part of an energy distribution system. During the articulation, the rigid linkage is capable of conserving its integrity to push the traction battery pack away from the deforming structures, thereby preventing the deforming structures from contacting the traction battery pack. These and other features are discussed in greater detail in the following paragraphs of this detailed description.

Figure 1:
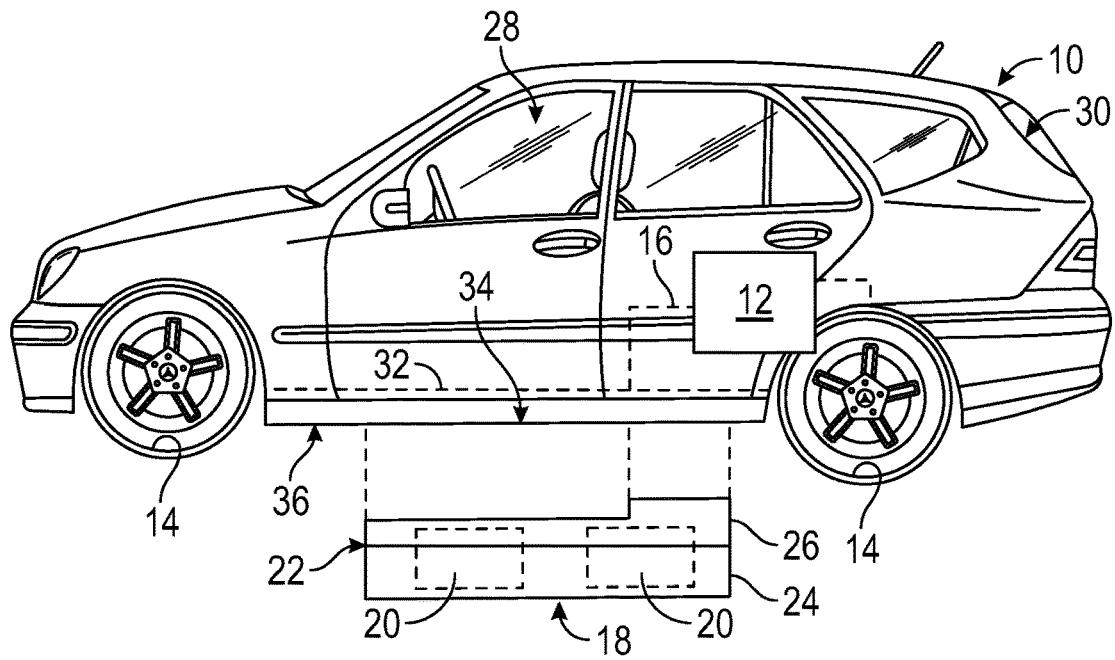
FIG. 1 schematically illustrates an electrified vehicle.

FIG. 1 schematically illustrates an electrified vehicle 10. The electrified vehicle 10 could be a car, a truck, a van, a sport utility vehicle, a crossover, or any other type of vehicle that includes an electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEVs), fuel cell vehicles, etc. Therefore, although not specifically shown in this embodiment, the electrified vehicle 10 could be equipped with an internal combustion engine that can be employed either alone or in combination with other energy sources to propel the electrified vehicle 10.

Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component.

In the illustrated embodiment, the electrified vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14 of the electrified vehicle 10.

A voltage bus 16 electrically connects the electric machine 12 to a traction battery pack 18. The traction battery pack 18 is an exemplary electrified vehicle battery. The traction battery pack 18 may be a high voltage traction battery pack that includes a plurality of battery arrays 20 (i.e., battery assemblies or groupings of rechargeable battery cells) capable of outputting electrical power to operate the electric machine 12 and/or other electrical loads of the electrified vehicle 10. Other types of energy storage devices and/or output devices can also be used to electrically power the electrified vehicle 10.

The battery arrays 20 may be housed inside an enclosure assembly 22 of the traction battery pack 18. The enclosure assembly 22 may be sealed enclosure of any size, shape, and configuration and may, in an embodiment, include a tray 24 and a cover 26.

The electrified vehicle 10 may include a passenger cabin 28 and a cargo space 30 (e.g., a trunk, truck bed, etc.) located to the rear of the passenger cabin 28. A floor panel 32 may separate the passenger cabin 28 from other portions of a vehicle frame 34, which generally establishes a vehicle underbody 36. In an embodiment, the traction battery pack 18 is suspended from or otherwise mounted to the vehicle frame 34 such that it is remote from both the passenger cabin 28 and the cargo space 30. The traction battery pack 18 therefore does not occupy space that would otherwise be available for carrying passengers or cargo.

Due at least in part to its mounting location at the underbody 36, the traction battery pack 18 may be susceptible to various vehicle loads including, but not limited to, impact loads (e.g., loads imparted during vehicle impact and running clearance events, for example), durability loads, and inertial loads. If not accommodated for, these loads could be transferred directly into the traction battery pack 18. This disclosure is therefore directed to mounting systems with rigid linkages designed for distributing energy to minimize or even prevent the transfer of the loads into the traction battery pack 18.

Figure 2:
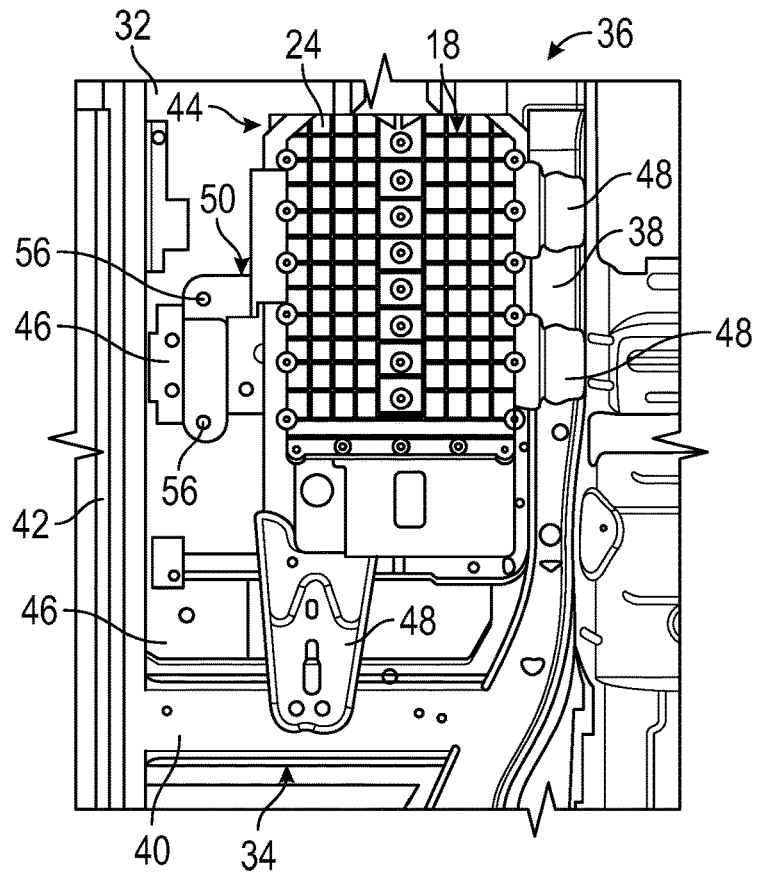
FIG. 2 illustrates select portions of an underside of the electrified vehicle of FIG. 1.
Figure 3:
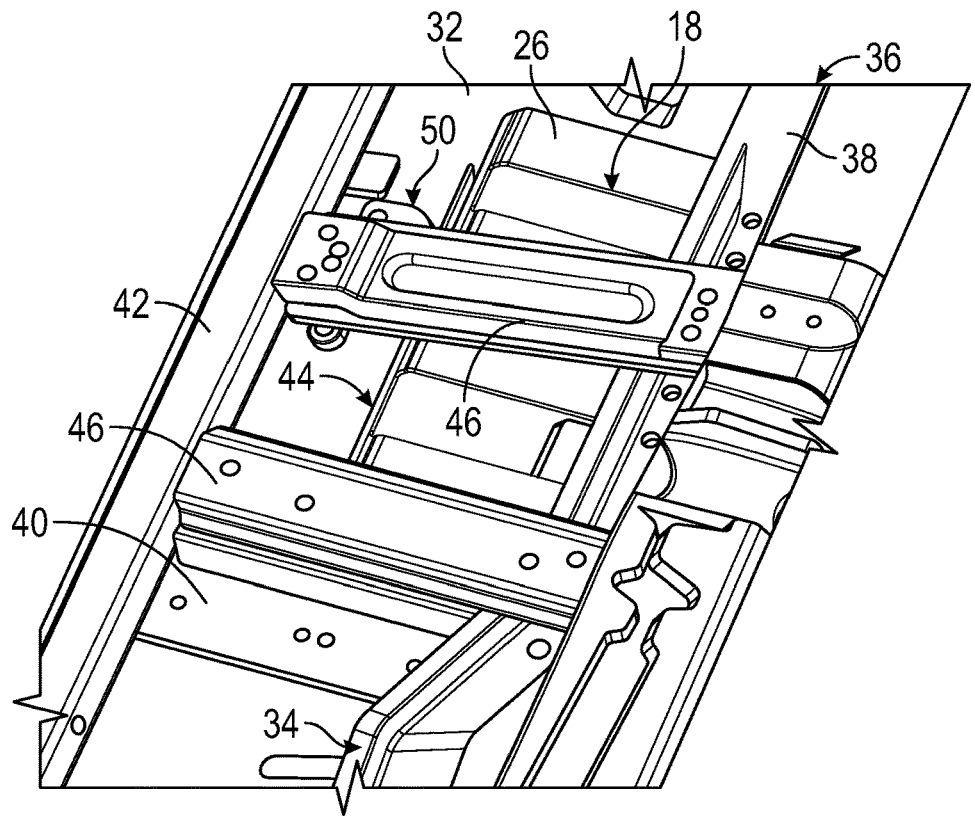
FIG. 3 is a top view of the vehicle underside of FIG. 2.

FIGS. 2-3 illustrate an exemplary packaging location of the traction battery pack 18 at the underbody 36 of the vehicle frame 34. The vehicle frame 34 (sometimes referred to simply as a "frame") is the main supporting structure of the electrified vehicle 10, to which various components are attached, either directly or indirectly. The vehicle frame 34 may include a unibody construction, in which the chassis and body of the electrified vehicle are integrated into one another, or may be part of a body-on-frame construction.

The vehicle frame 34 may include one or more longitudinal members 38, e.g. tunnel runners, that extend along a length of the electrified vehicle 10 and one or more cross-members 40 that extend across a width of the vehicle. The vehicle frame 34 may further include a rocker 42 that extends adjacent to one longitudinal side surface 44 of the traction battery pack 18. The rocker 42 forms a beam/frame member that extends along a side of the vehicle between the front and rear doors.

One or more seat cross-members 46 of the vehicle frame 34 may extend between the rocker 42 and one of the longitudinal members 38. The seat cross-members 46 may support a seat positioned within the passenger cabin 28. The floor panel 32 of the vehicle frame 34 extends over top of all or portions of the longitudinal member 38, the cross member 40, the rocker 42, and the seat-cross member 46.

In an embodiment, the traction battery pack 18 is mounted axially between the rocker 42 and the longitudinal member 38. In the illustrated embodiment, the traction battery pack 18 is mounted adjacent to the rocker 42 associated with a passenger side of the electrified vehicle 10. However, the traction battery pack 18 could alternatively be mounted adjacent to a rocker associated with a driver side of the electrified vehicle 10. In the mounted position, the cover 26 of the traction battery pack 18 faces toward the floor panel 32 and the tray 24 of the traction battery pack 18 faces toward the ground.

The traction battery pack 18 may be mounted such that a gap extends between the cover 26 of the enclosure assembly 22 of the traction battery pack 18 and the seat cross-member 46. The seat cross-member 46 and the floor panel 32 both extend over top of the traction battery pack 18.

A plurality of mounting brackets 48 may be used to mount the traction battery pack 18 to the vehicle frame 34. In an embodiment, two mounting brackets 48 are used to mount the traction battery pack 18 to the longitudinal member 38, and another mounting bracket 48 is used to mount the traction battery pack 18 to the cross-member 40. The mounting brackets 48 may be welded, bolted, or both welded and bolted to the traction battery pack 18 and to the longitudinal member 38 or the cross-member 40. The total number and configuration of the mounting brackets 48 used to mount the traction battery pack 18 relative to the underbody 36 may vary per vehicle design and is therefore not intended to limit this disclosure. In some embodiments, at least one of the mounting brackets 48 (here, the mounting bracket 48 connected to the cross-member 40) may include a different configuration than the other mounting brackets 48.

A rigid linkage 50 may also be used to mount the traction battery pack 18 to the vehicle frame 34. Together, the mounting brackets 48 and the rigid linkage 50 establish a mounting system for mounting the traction battery pack 18 to the vehicle frame 34. Although only a single rigid linkage is illustrated in the exemplary embodiment of FIGS. 2-3, the mounting system could employ one or more of the rigid linkages 50 within the scope of this disclosure.

In an embodiment, the rigid linkage 50 is mounted to the seat cross-member 46 and to the longitudinal side surface 44 of the traction battery pack 18. In this embodiment, the longitudinal side surface 44 faces in a direction toward the rocker 42. A majority of the rigid linkage 50 may therefore be positioned between the rocker 42 and the traction battery pack 18.

The rigid linkage 50 may be welded, bolted, or both welded and bolted to the traction battery pack 18 and to the seat cross-member 46. In an embodiment, the rigid linkage 50 is welded to the longitudinal side surface 44 of the traction battery pack 18 and is bolted to the seat cross-member 46. However, other configurations are also contemplated.

Figure 4:
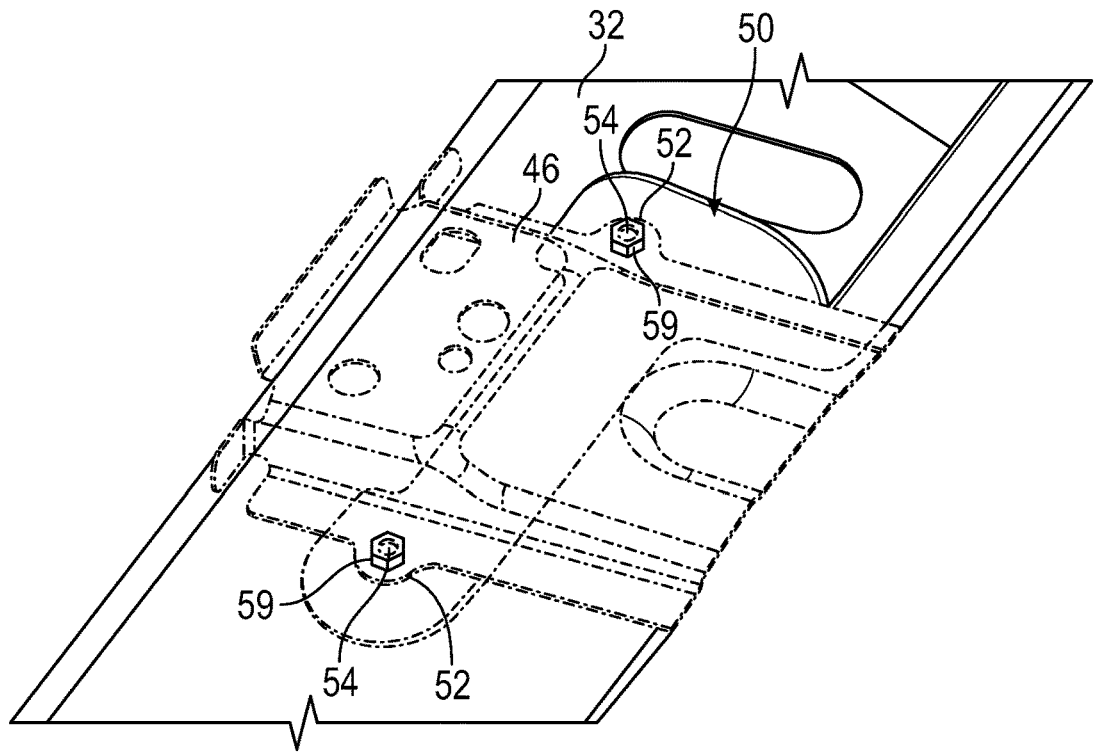
FIG. 4 illustrates an exemplary mounting configuration between multiple vehicle components.

An exemplary mounting configuration of the rigid linkage 50 at the seat cross-member 46 is depicted in FIG. 4. The seat cross-member 46 may include two or more mounting tabs 52 that include mounting openings 54. The mounting openings 54 may align with corresponding mounting openings 56 (see FIG. 2) formed through the rigid linkage 50 for receiving a fastener 59 (e.g., a bolt, screw, etc.). In an embodiment, each fastener 59 is received through each of the rigid linkage 50, the seat cross-member 46, and the floor panel 32 for joining these components together.

FIGS. 5A, 5B, and 5C, with continued reference to FIGS. 1-4, illustrate in greater detail the rigid linkage 50 of the exemplary traction battery pack 18 mounting system. As further detailed below, the rigid linkage 50 is designed to allow the traction battery pack 18 to articulate away from deforming structures (e.g., the floor panel 32) of the vehicle frame 34 during certain conditions (e.g., front, side, side pole, rear loads, etc.).

The rigid linkage 50 may include a first mount section 58, a second mount section 60, and a bridge section 62 extending between the first and second mounting sections 58, 60. Together, the first mount section 58, the second mount section 60, and the bridge section 62 establish a monolithic structure having no mechanical fasteners. The first mount section 58 and the second mount section 60 may protrude in opposite directions from the bridge section 62. Therefore, in an embodiment, the rigid linkage 50 is generally Z-shaped. However, other shapes are also contemplated within the scope of this disclosure.

When mounted, the first mount section 58 of the rigid linkage 50 interfaces with the seat cross-member 46, and the second mount section 60 of the rigid linkage 50 interfaces with the traction battery pack 18. The mounting openings 56 are formed through the first mount section 58 for bolting the rigid linkage 50 to the seat cross-member 46. The second mount section 60 may include a edge profile 64 (See FIG. 5A) for accommodating a weld bead for welding the second mount section 60 to the traction battery pack 18. Alternatively, the second mount section 60 could also include mounting openings 66 for bolting the rigid linkage 50 to the enclosure assembly 22 of the traction battery pack 18.

The bridge section 62 may connect at one end of each of the first mount section 58 and the second mount section 60. In an embodiment, the bridge section 62 is curved between the first and second mount sections 58, 60.

One or more ribs 68 may be formed in each of the first mount section 58, the second mount section 60, and the bridge section 62. The ribs 68 are configured to increase the strength and stiffness of the rigid linkage 50.

The rigid linkage 50 may be made of a relatively stiff metallic material. In an embodiment, the rigid linkage is made of a high strength low alloy (HSLA) steel, such as boron steel, for example. Other high strength materials could alternatively be used to manufacture the rigid linkage 50 within the scope of this disclosure.

The rigid linkage 50 may be made of a different material compared to the seat cross-member 46 and the floor panel 32. For example, in an embodiment, the rigid linkage 50 may be made of a boron steel, the seat cross-member 46 may be made of a dual phase steel, and the floor panel 32 may be made of a mild steel.

Figure 6:
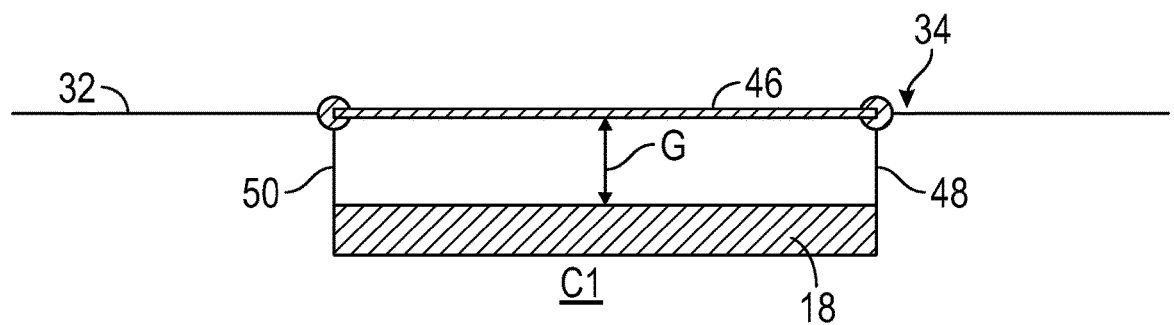
FIG. 6 schematically illustrates a first configuration of a vehicle frame mounted traction battery pack.
Figure 7:
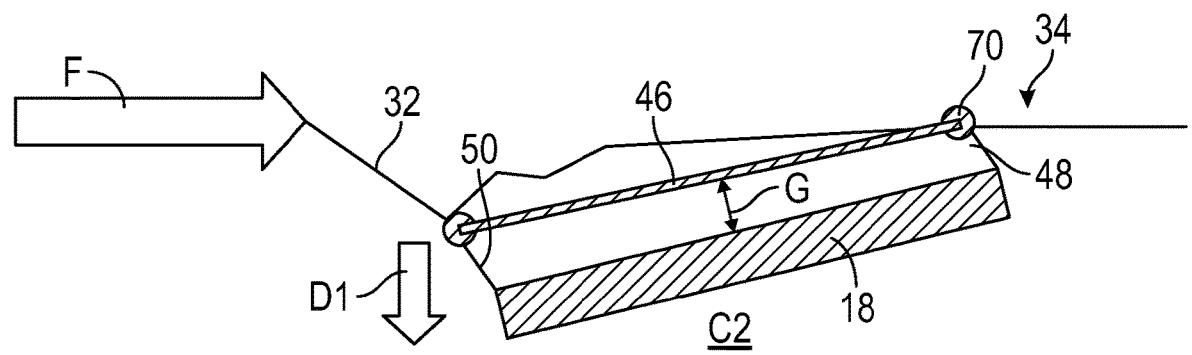
FIG. 7 schematically illustrates a second configuration of the vehicle frame mounted traction battery pack of FIG. 6.

FIGS. 6 and 7, with continued reference to FIGS. 2-5C, schematically illustrate a first configuration C1 and a second configuration C2, respectively, of the vehicle frame mounted traction battery pack 18. In the first configuration C1 of FIG. 6, the traction battery pack 18 is secured to the seat cross-member 46 by both the rigid linkage 50 and one or more mounting brackets 48 of the mounting system. In the exemplary embodiment, the rigid linkage 50 is positioned at an outboard side of the traction battery pack 18 and the mounting bracket 48 is positioned at an inboard side of the traction battery pack 18. Together, the rigid linkage 50, the seat cross-member 46, the mounting bracket 48, and the traction battery pack 18 may establish a four-bar linkage for supporting the traction battery pack 18 relative to the vehicle frame 34.

Referring now to the second configuration C2 of FIG. 7, the behavior of the mounting system is schematically illustrated during an energy distribution event in which a force F is imparted into the vehicle frame 34. The vehicle energy distribution event may be the result of a side impact loading event or a side pole impact loading event in which the force F is imparted into a side of the electrified vehicle 10, for example.

During the energy distribution event, the force F is initially absorbed by the floor panel 32 and the seat-cross member 46, thereby causing one or both of these components to deform downwardly. As the downward deformation occurs, the rigid linkage 50 is capable of conserving its integrity, thereby causing the traction battery pack 18 to articulate away from the impact zone (i.e., in a direction D1) by maintaining a gap G between the traction battery pack 18 and the seat cross-member 46. The traction battery pack 18 may pivot at a pivot point 70 established by the mounting bracket 48 as the traction battery pack 18 is pushed in the same direction as the deformation by the rigid linkage 50. The mounting system, and in particular the rigid linkage 50, therefore establishes a low-cost solution for reducing the transfer of the force F into the traction battery pack 18 and thus improves the structural performance of the traction battery pack 18 during the energy distribution event.

The exemplary traction battery pack rigid linkages of this disclosure provide efficient and low cost strategies for energy distribution of underbody mounted battery structures. By moving/articulating the traction battery pack away from vehicle impact zones, the transfer of loads into the traction battery pack is minimized or even eliminated. The proposed designs are highly feasible by virtue of simple linkage attachments and detachments and can be scalable for use on multiple vehicle platforms. The mounting systems of this disclosure provide improved solutions for packaging, serviceability, structural integrity, and protection of electrified vehicle traction battery packs.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
   a frame including a cross-member;
   a traction battery pack;
   a rigid linkage secured to the cross-member and the traction battery pack,
   wherein the rigid linkage is configured to articulate the traction battery pack away from a deforming structure of the frame; and
   a mounting bracket secured to the traction battery pack and the cross-member,
   wherein the rigid linkage includes a first mount section mounted to the cross-member, a second mount section mounted to the traction battery pack, and a curved bridge section extending between the first mount section and the second mount section.

2. The electrified vehicle as recited in claim 1, wherein the frame includes a rocker and a longitudinal member, and further wherein the traction battery pack is mounted axially between the rocker and the longitudinal member.

3. The electrified vehicle as recited in claim 2, wherein the cross-member is a seat cross-member that extends between the rocker and the longitudinal member.

4. The electrified vehicle as recited in claim 2, comprising a second mounting bracket that connects between the traction battery pack and the longitudinal member.

5. The electrified vehicle as recited in claim 4, wherein the rigid linkage, the cross-member, the mounting bracket, and the traction battery pack establish a four-bar linkage for supporting the traction battery pack relative to the frame.

6. The electrified vehicle as recited in claim 1, comprising a fastener received through the first mount section and the cross-member.

7. The electrified vehicle as recited in claim 6, wherein the fastener further extends through a floor panel of the frame.

8. The electrified vehicle as recited in claim 7, wherein the rigid linkage is comprised of a boron steel, the cross-member is comprised of a dual phase steel, and the floor panel is comprised of a mild steel.

9. The electrified vehicle as recited in claim 1, wherein the rigid linkage is made of high strength low alloy material and the cross-member is made of a different material than the rigid linkage.

10. The electrified vehicle as recited in claim 1, comprising a second mounting bracket that connects between the traction battery pack and a longitudinal member of the frame and establishes a pivot point for pivoting the traction battery pack as the traction battery pack articulates away from the deforming structure.

11. The electrified vehicle as recited in claim 1, wherein the deforming structure is a floor panel of the frame.

12. The electrified vehicle as recited in claim 1, wherein the rigid linkage maintains a gap between a cover of the traction battery pack and the cross-member.

13. The electrified vehicle as recited in claim 1, wherein the cross-member extends over top of the traction battery pack.

14. The electrified vehicle as recited in claim 13, wherein at least a portion of the cross-member is located vertically between a cover of an enclosure assembly of the traction battery pack and a floor panel of the frame.

15. The electrified vehicle as recited in claim 13, comprising a fastener received through the rigid linkage, the cross-member, and a floor panel of the frame for joining the rigid linkage, the cross-member, and the floor panel together.

16. The electrified vehicle as recited in claim 15, wherein the fastener extends through a first mounting opening formed through the rigid linkage, a second mounting opening formed through a mounting tab of the cross-member, and a third mounting opening formed through the floor panel.

17. The electrified vehicle as recited in claim 1, wherein each of the first mount section, the second mount section, and the curved bridge section includes a rib adapted to increase a strength and a stiffness of the rigid linkage.

18. An electrified vehicle, comprising:
    a frame including a cross-member;
    a traction battery pack;
    a rigid linkage secured to the cross-member and the traction battery pack,
    wherein the rigid linkage is configured to articulate the traction battery pack away from a deforming structure of the frame; and
    a mounting bracket secured to the traction battery pack and the cross-member,
    wherein the rigid linkage is generally Z-shaped.

19. An electrified vehicle, comprising:
    a frame including a rocker, a longitudinal member, a seat cross-member that extends between the rocker and the longitudinal member, and a floor panel;
    a traction battery pack mounted axially between the rocker and the longitudinal member such that a first longitudinal side surface of the traction battery pack faces toward the rocker and a second longitudinal side surface of the traction battery pack faces toward the longitudinal member,
    wherein the seat cross-member is mounted vertically below the floor panel such that the seat cross-member extends over top of the traction battery pack,
    wherein the traction battery pack is mounted vertically below the seat cross-member such that a gap extends between a cover of an enclosure assembly of the traction battery pack and the seat cross-member;
    a first mounting bracket for securing the traction battery pack to the seat cross-member;
    a rigid linkage for securing the traction battery pack to the seat cross-member, wherein the rigid linkage is configured to articulate the traction battery pack away from the floor panel such that the traction battery pack pivots about a pivot point established by the first mounting bracket during an energy distribution event; and
a fastener received through the rigid linkage, the seat cross-member, and the floor panel for joining the rigid linkage, the seat cross-member, and the floor panel together.

* * * * *